July 10, 1962 H. J. KAMINSKI 3,043,205
CAMERA SUPPORT AND ACTUATING MEANS
Filed June 5, 1961 2 Sheets-Sheet 2
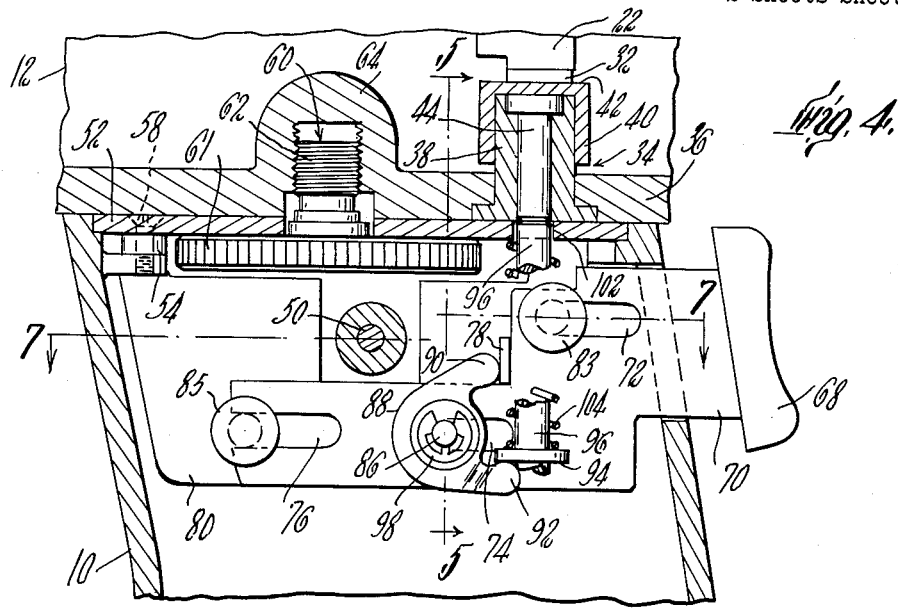
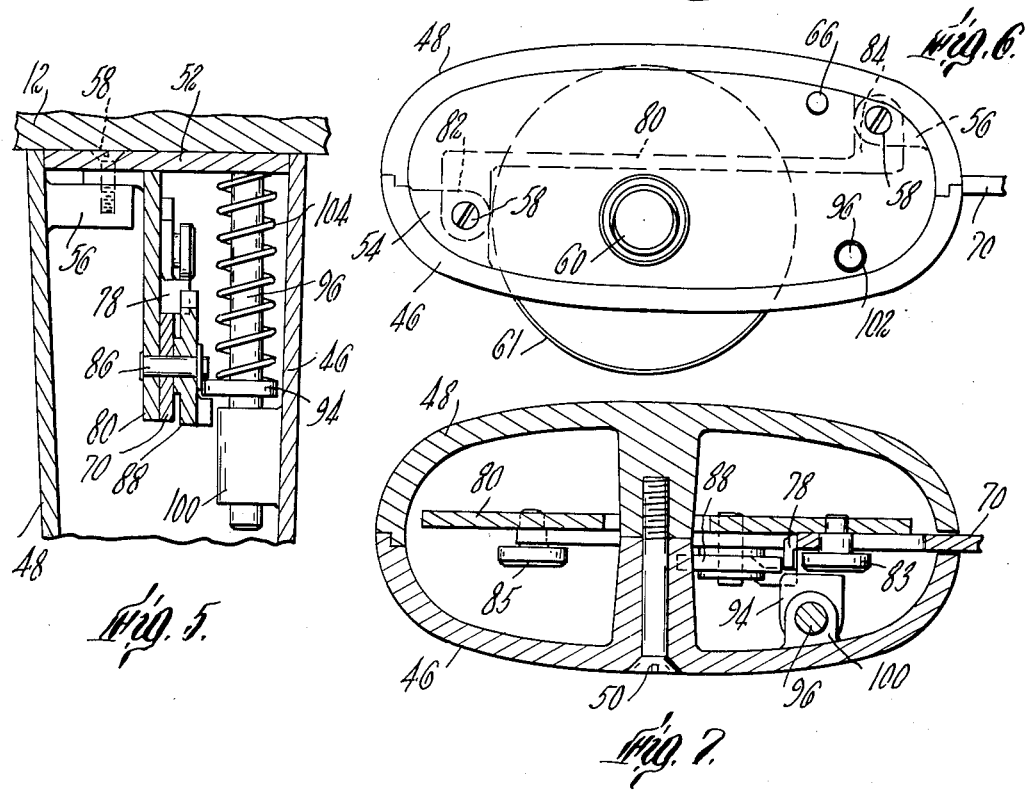

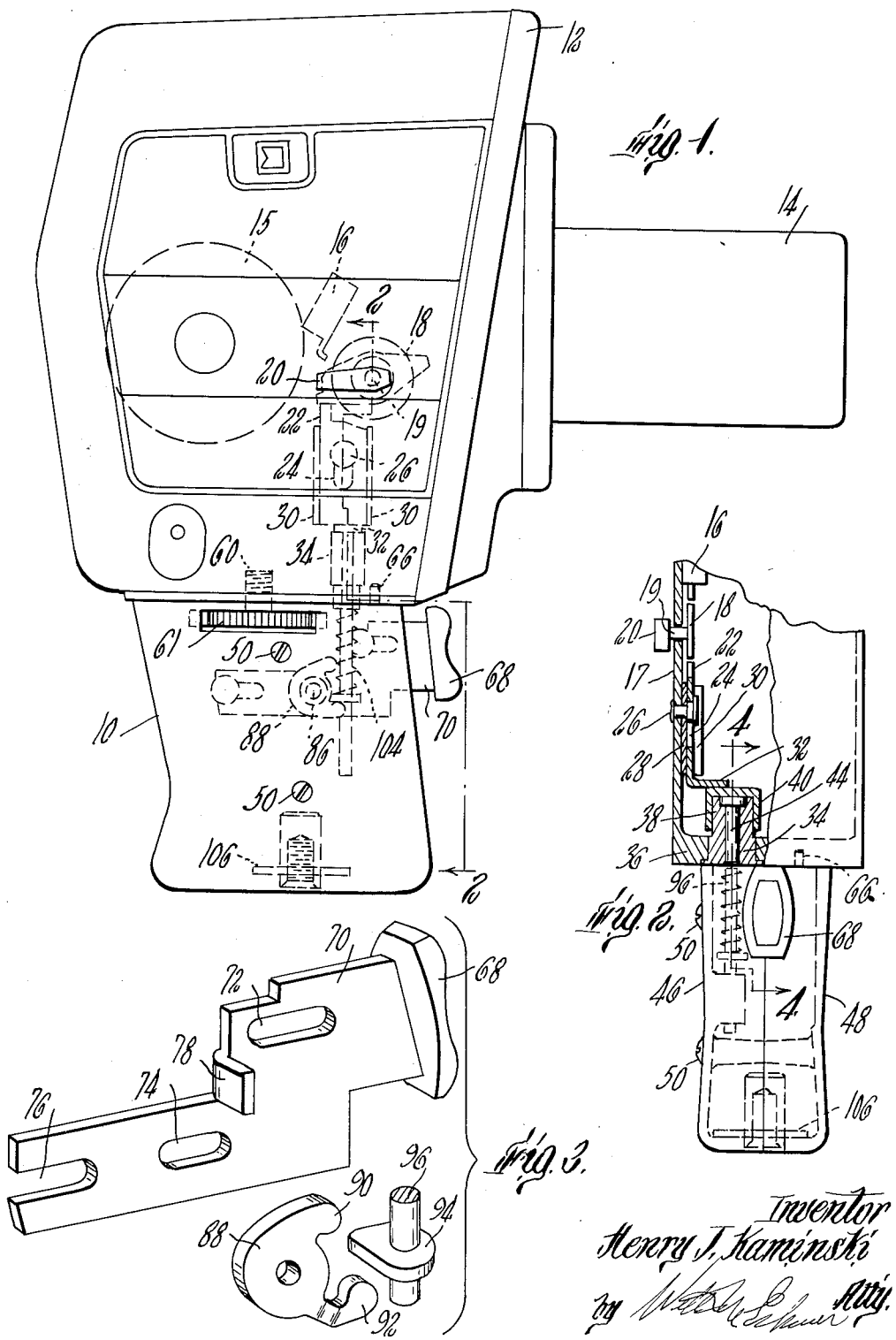

United States Patent Office 3,043,205
Patented July 10, 1962

3,043,205
CAMERA SUPPORT AND ACTUATING MEANS
Henry J. Kaminski, Hingham, Mass., assignor to Keystone Camera Company, Inc., Boston, Mass., a corporation of Massachusetts
Filed June 5, 1961, Ser. No. 114,918
16 Claims. (Cl. 95—86)

This invention relates to motion picture cameras and more particularly to a novel and improved accessory adapted to be attached to such cameras to facilitate the manipulation and operation thereof.

The motion picture camera for amateur use is normally designed to be hand held and usually both hands are required for proper manipulation and operation of such cameras. Although a principal feature of such cameras is their compactness there have been numerous requests for improvements directed toward improving the ease of manipulation and operation. Among the proposed improvements is a permanently attached handle which contains an actuator mechanism so that the camera may be held and operated with one hand. However, there has been substantially objection to the provision of such a permanently attached handle as it increases the bulk of the camera, often making it more onerous to carry and more difficult to store. While detachable operating handle mechanisms have been devised the arrangements heretofore proposed have also met with consumer objections due to the cost, the complexity and/or the unsightliness of those arrangements as they employed external operating cables or other types of mechanical linkages and also due to frequent unreliability of operation of the devised arrangements in certain instances.

Accordingly, it is an object of this invention to provide an improved motion picture camera operating handle accessory which is easily attached and removed from the camera and which enables reliable one handed manipulation and operation of the camera.

Another object of the invention is to provide an improved detachable motion picture camera operating accessory which cooperates with a control mechanism located inside the camera case so that external linkages or other similar mechanical connections are not required.

Still another object of the invention is to provide an improved motion picture camera operating handle eccessory which may be easily attached to the camera for operation of the operating mechanism through the manipulation of only a single fastening means.

A further object of the invention is to provide an improved operating handle accessory for a motion picture camera which has a normal manually operated control means permanently mounted on the case, which operating handle accessory mechanism does not interfere with operation of the permanently affixed control means.

In accordance with principles of the invention there is provided an operating accessory which cooperates with a conventional form of motion picture camera. The camera includes a case, a lens system mounted on the case, a film holder and film advancing means mounted within the case. The camera case also has a control lever or the suitable manual control means mounted externally on the case for controlling the camera operation. A second control means which cooperates with the operating accessory includes an actuating member mounted inside the case which, in conjunction with a light baffle structure, independently operates the film advancing means. The detachable operating accessory includes a handle portion shaped so that it may include a top plate which mates with a portion of the bottom of the camera case so that the hand held accessory supports the camera for proper desired manipulation and operation. The accessory is easily and quickly attached or detached from the camera case and is secured thereto by a single fastening member and includes a trigger member, an actuating rod and a linkage operated by a trigger mechanism which moves the actuating rod substantially perpendicularly to the top plate. The actuating rod contacts the light baffle structure when the handle is attached to the camera case and moves that structure and the second control means as a unit to control the operation of the camera. The accessory is a compact structure which when attached to the camera functions as an integral unit with the camera enables the camera to be selectively operated, properly positioned and easily manipulated by a single hand. When attached to the camera case it in no way interferes with the manual control means which normally controls the operation of the camera. The accessory thus provides a compact operating handle structure which enables a motion picture camera to be held and operated with a single hand, which is easily attached to and detached from the camera case, and which provides accurate operating control in a simple and reliable manner.

Other objects, features and advantages of the invention will be seen as the following description of a preferred embodiment thereof progresses in conjunction with the drawings, in which:

FIG. 1 is a side elevational view of an 8-millimeter motion picture camera with the pistol grip operating handle accessory embodying principles of the invention attached thereto;

FIG. 2 is an end view, partially in section, taken along the line 2—2 of FIG. 1 of the supplemental operating control actuator mounted inside the case and the pistol grip operating handle accessory disposed in operative relation thereto;

FIG. 3 is an exploded perspective view of the several elements of the actuating linkage mounted within the preferred embodiment of the operating handle accessory;

FIG. 4 is a sectional view taken along the line 4—4 of FIG. 2 showing details of the internal actuator mechanism, the actuating linkage in the operating handle and the operating handle fastening means;

FIG. 5 is a sectional view taken along the line 5—5 of FIG. 4 showing an elevational view of several components employed in the operating handle linkage;

FIG. 6 is a top plan view of the operating handle accessory; and

FIG. 7 is a sectional view taken along the lines 7—7 of FIG. 4 showing another view of the relationship of the several members in the operating handle linkage.

As shown in FIG. 1 the operating handle structure 10 constructed in accordance with principles of the invention is attached to the case 12 of an 8-millimeter motion picture camera. The lens system 14 associated with the camera is attached to the front of the case and extends forwardly thereof. Mounted within the camera case is a spring drive motor generally indicated by the circle 15, a motor control element 16 secured to a wall 17 of the case and an operating control arm 18 which is mounted on a shaft 19 that extends through the wall of the case. The control arm 18 is pivoted with the shaft 19 by operation of the external control lever 20 for appropriately contacting the control element 16 to operate the drive motor 15. Also mounted within the case 12 as shown in FIGS. 1 and 2 is a vertically reciprocable slide member 22 which has a slot 24 therein through which a stud 26, secured to the vertical wall 17 of the case 12, extends. Positioned between the slide member 22 and the wall 17 is a guide member 28 which has flanged edges 30 extending inwardly of either side of the slide 22 to control and guide the vertical movement of the slide member. The bottom portion of the slide member 22 is bent inwardly away from the case wall to form a foot portion 32 that rests in engagement with the top of the cylindrical light baffle structure 34. This light baffle structure is mounted in the floor 36 of the camera case and includes an upstanding stud portion 38 which has a cylindrical bore axially disposed therein. A cylindrical baffle member is positioned on this stud and includes a skirt portion 40 closely conforming to the exterior wall of the stud 38, a top surface 42 on which the foot of the slide member 22 rests, and a depending shaft 44 which passes down through the cylindrical bore in the stud 38. The cooperating surfaces of the stud 38 and the baffling member are accurately formed relative to one another so that a light baffling structure which prevents light rays external to the case from entering the case even though the shaft 44 is reciprocated for operating the slide member 22.

The operating handle structure or "pistol grip" 10 includes two molded wall halves 46, 48 which are secured together with screws 50, and a top plate member 52 which is secured to ears 54 and 56, molded into the halves 46, 48 respectively, by screws 58. The top plate is dimensioned so that it conforms for mating relationship with a cooperating portion of the bottom of the camera case. A captive screw 60 has a knurled cylindrical head portion 61 secured in a recess beneath the top plate 52 and a threaded portion 62 which extends upwardly through the top plate and which is arranged to cooperate with a threaded hole formed in a bulge 64 extending upwardly from the floor 36 inside the camera case. This threaded hole structure 64 may be that conventionally provided for attachment of a tripod or a light bar for example. A locating pin 66 also is provided on the top plate and cooperates with a correspondingly dimensioned recess in the floor of the camera case to properly locate the operating handle structure relative to the camera case when the handle is attached thereto.

Extending forwardly from the pistol grip handle is a trigger actuator member which has a finger engaging pad 68 mounted on a formed actuator plate 70 that has three slots therein, slots 72 and 74 being closed slots and slot 76 being an open slot. The actuator plate also includes a short flange portion 78 which is bent at right angles thereto. The plate 70 is supported for horizontal sliding movement from the vertically disposed, substantially centrally located wall member 80 which has tab portions 82 and 84 that are positioned over the ears 54 and 56 respectively and are secured in position by screws 58. Positioning studs 83 and 85 are curled over (riveted) to the wall 80 and provide guide surfaces which cooperate with slots 72 and 76 respectively as indicated in FIG. 4. The slot 74 receives a shaft 86 which is also secured to the wall 80.

The shaft 86 supports a bell crank member 88 which is formed as indicated in FIG. 3 to provide a first end portion 90 which engages the offset flange 78 of the slide 70 and a second offset end portion 92 which cooperates with a disc portion 94 on the actuating rod 96. The bell crank is secured over the slide 70 on the shaft 86 by a suitable retaining ring 98. As best seen in FIG. 5 the actuating rod 96 passes through a bushing 100 formed in a portion of the wall 46 of the housing and extends upwardly through an aperture 102 in the top plate 52. A biasing spring 104, positioned between the disc 94 and the top plate 52, acts to bias the actuating rod 96 and disc portion 94 downwardly into engagement with the offset end portion 92 of the bell crank 88.

Molded into the bottom of the actuating handle 10 is a receptacle for a threaded hole structure 106 similar to the hole structure 64 in the bottom of the camera case which is adapted to receive a light bar or similar device which is attached by suitable securing means so that the camera and cooperating equipment may be held and appropriately manipulated with one hand through the use of the operating handle accessory if so desired.

It will be seen that the actuating rod 96 is aligned with the light baffle shaft 44 when the operating handle is attached by means of the captive screw 60 to the camera case 12. In this position by gripping the operating handle urging the slide member 70 rearwardly in normal triggering action through contact with pad 68 the slide member is moved rearwardly to rotate the bell crank 88 about the shaft 86 and causes the actuating rod 96 to be moved upwardly against the light baffle shaft 44. As the light baffle movable member lifts the slide 22 the operating mechanism 18 is pivoted upwardly and engages the control element 16 to operate the drive motor. Upon release of the trigger 68 the spring 104 biases the mechanism downwardly, allowing the actuating member to pivot away from the control element 16 so that the drive motor is stopped.

Thus this simple apparatus accessory neatly permits the camera to be held in one hand to be reliably operated thereby. The attachment of the operating handle is independent of the manual control lever on the outside of the camera case and does not impair the operability of that lever so that selective use of either operating mechanism is permissible as desired. The accessory is inexpensive and may be manufactured by mass production methods. It is reliable in operation and cooperates with a light baffle assembly and control member actuating slide positioned internally on the camera case in a compact arrangement which occupies a minimum amount of space. The operating handle mechanism permits design flexibility so that the handle structure may take a number of compact attractive forms, each of which is easily attached to or removed from the camera as desired and may be designed for association with different sizes and types of cameras. While a preferred embodiment of the invention has been shown and described, various modifications thereof will be obvious to those skilled in the art and therefore it is not intended that the invention be limited to the described embodiment or to details thereof and departures may be made therefrom within the spirit and scope of the invention as defined in the claims.

What is claimed is:

1. A camera support and operating accessory for use in conjunction with a motion picture camera having a case, a camera operation drive motor, a motor control mechanism mounted within said case, first actuating means mounted on said case including a control element extending outwardly from said case for manual manipulation by the operator of said camera, means coupling said first actuating means to said motor control mechanism so that manual manipulation of said first actuating means by the operator of said camera will actuate said motor control mechanism to operate said drive motor, an aperture in the bottom surface of said camera case, second actuating means connected to said motor control mechanism including a movable element mounted behind said aperture at the bottom of said camera case for operating said motor control mechanism in response to the movement of said movable element, and accessory attachment means at the bottom of said camera case;

said accessory comprising a handle member having a surface adapted to mate with a surface portion at the bottom of said camera case, an actuating rod in said handle member mounted for movement in a direction perependicular to and through the plane of said matable surface, manually releasable fastening means at the top of said handle member adapted to cooperate with said accessory attachment means for releasably securing said matable surface of said handle member in mating engagement with said surface portion of said camera case with said actuating rod in alignment with the exposed portion of said movable element at the bottom of said camera case when said matable surface of said handle member is secured in mating engagement with said camera case, a trigger member having a portion extending outside of said handle member, a mechanical linkage coupling said trigger member and said actuating rod, said mechanical linkage being mounted in said handle member to produce movement of said actuating rod through the plane of said matable surface and the bottom of said camera case into contact with said exposed portion of said movable element when said accessory is secured to the camera for operating said motor control mechanism in response to the movement of said trigger member towards said handle member, and resilient means cooperating with said actuating rod acting to bias said actuating rod inwardly of said handle member.

2. The accessory as claimed in claim 1 wherein said mechanical linkage includes a reciprocable element connected to said trigger member, said reciprocable element including a surface disposed generally perpendicularly to the direction of movement of said element, a crank member mounted for rotation in said handle portion, said crank member having a first terminal portion adapted to engage said reciprocable element surface and a second terminal portion adapted to engage said actuating rod for upward movement thereof to move said movable element and operate said camera drive mechanism when said trigger is operated.

3. In combination a motion picture camera having a case, a camera operating mechanism mounted within said case, first and second control elements for controlling the operation of said operating mechanism, said first control element being mounted externally of said case and said second control element being mounted internally of said case, a light baffle structure mounted adjacent the bottom of said case and adapted to be moved in response to external actuation to operate said second control element, an operating handle accessory for releasable attachment to the bottom of said camera case, a trigger member secured to said handle accessory arranged for movement toward and away from said handle accessory and for actuation by a finger of the hand holding said handle accessory, a mechanical linkage and an actuating member in said handle accessory, said mechanical linkage cooperating with said trigger and said actuating member to convert the motion of said trigger into movement of said actuating member in a direction substantially perpendicularly to the top surface of said handle accessory, and fastening means to secure said accessory to said camera case with said top surface in contact with the bottom of said case and said actuating member aligned with said light baffle structure so that movement of said trigger member raises said actuating member and moves said light baffle structure to operate said second camera operation control means.

4. The combination as claimed in claim 3 and further including a common camera operating mechanism actuating device, wherein said first control element is mechanically connected to said common actuating device and said second control element is movable into and out of contact with said common actuating device so that said first element may operate said mechanism independently of said second element.

5. The combination as claimed in claim 3 wherein said second control element includes a reciprocable slide member having a foot portion which normally engages said light baffle structure, and said light baffle structure includes a stud upstanding from the bottom of said case and a baffle member reciprocable relative to said stud and having a skirt portion, the inner surface of which closely conforms to the outer surface of said stud to prevent light from entering said camera case when said baffle member is reciprocated to move said slide member.

6. The accessory as claimed in claim 5 wherein said mechanical linkage includes a reciprocable element connected to said trigger member, said reciprocable element including a surface disposed generally perpendicularly to the direction of movement of said element, a crank member mounted for rotation in said handle accessory, said crank member having a first terminal portion adapted to engage said reciprocable element surface and a second terminal portion adapted to engage said actuating member for upward movement thereof to move said light baffle structure and said second control element when said trigger is operated.

7. In combination, a motion picture camera having a case, a camera drive motor mounted within said case, motor control means mounted within said case, camera actuating means mounted on said case and having a portion extending outwardly from said case for manual manipulation, a first linkage coupling said actuating means to said motor control means, a second linkage mounted within said camera case and connected to said motor control means, said second linkage including a light baffle portion disposed adjacent the lower surface of said camera case, said light baffle portion being movable between a first position where said motor control means renders said drive motor inoperative and a second position where said motor control means enables said drive motor to operate the camera, a threaded socket in said lower surface; and a camera support and operating accessory having a handle portion formed to be held in one hand by the operator of the camera, a trigger member protruding from said handle portion, said handle portion having an upper surface for disposition in mating relation to the lower surface of said camera case adjacent said light baffle portion of said second linkage, a light baffle engaging element carried by said handle and connected for movement in response to movement of said trigger member, and captive screw means carried adjacent said upper surface adapted to cooperate with said threaded socket to secure said operating accessory in position relative to said camera case with the upper surface of said accessory in mating relation to the lower surface of said camera case and said engaging element disposed for engagement with said light baffle portion of said second linkage in response to movement of said trigger member, so that movement of said trigger will cause said engaging element to move said light baffle portion from said first position to said second position to enable operation of said camera drive motor.

8. In combination, a motion picture camera having a case, a camera drive motor mounted within said case, motor control means mounted within said case and connected to control the operation of said drive motor, actuating means mounted on said case for manual manipulation by the operator of said camera, a first linkage coupling said actuating means to said motor control means so that movement of said actuating means by the operator of said camera will actuate said first linkage and said motor control means to operate said drive motor, a second linkage mounted within said camera case and connected to said motor control means including a reciprocable light baffle portion having a surface exposed exteriorly of said camera case and normally disposed adjacent the lower surface of said camera case, said light baffle portion being movable between a first position where said motor control means renders said drive motor inoperative and a second position where said motor control means enables said drive motor to operate the camera, and a threaded socket in said lower surface; and a camera support and operating accessory having a handle portion formed to be held in one hand by the operator of the camera, a reciprocable trigger member protruding from said handle portion, an upper surface for mating engagement with the lower surface of said camera case adjacent said light baffle portion of said second linkage, a pin carried by said handle adapted to be positioned in alignment with said reciprocable light baffle portion when said accessory upper surface and said case lower surface are in mating engagement, means to move said pin in a direction normal to said accessory upper surface in response to movement of said trigger, and captive screw means carried adjacent said upper surface adapted to cooperate with said threaded socket to secure said operating accessory in position relative to said camera case with the upper surface of said operating accessory disposed parallel to and in mating engagement with the lower surface of said camera case and said pin aligned with said reciprocable light baffle portion of said second linkage so that said accessory supports said camera case and movement of said trigger member by the operator of said camera will cause said pin to engage said light baffle portion and actuate said second linkage and said motor control means to operate said drive motor.

9. In combination, a motion picture camera having a case,
 a lens system supported on said case,
 means to position photographic film behind said lens system,
 a camera drive motor mounted within said case for advancing said photographic film past said lens system in a picture taking operation,
 motor control means mounted within said case and connected to control the operation of said drive motor,
 first actuating means mounted on said case and having a portion extending outwardly from said case for manual manipulation by the operator of said camera,
 means coupling said first actuating means to said motor control means so that manual manipulation of said first actuating means by the operator of said camera will actuate said motor control means to operate said drive motor,
 an aperture in the bottom surface of said camera case,
 second actuating means mounted within said camera case including a movable element mounted behind said aperture,
 means coupling said movable element to said motor control means so that movement of said movable element will actuate said motor control means to operate said drive motor,
 light baffle means in said camera case for preventing external light entering said camera case through said aperture from impairing the quality of the photographic film in said camera case,
 and accessory attachment means at the bottom of said camera case;
 and a camera support and operating accessory comprising a handle portion formed to be held in one hand by the operator of the camera,
 said handle portion having a top surface adapted to be disposed immediately adjacent the bottom surface of said camera case,
 manually releasable fastening means at the top of said handle portion adapted to cooperate with said accessory attachment means for releasably securing the top surface of said handle portion immediately adjacent said bottom surface of said camera case,
 an actuating member mounted in said handle portion adjacent said handle portion top surface,
 said actuating member being aligned with said aperture when said handle portion is secured by said fastening means to said camera case,
 a trigger member having a portion extending outside of said handle portion,
 and linking means coupling said trigger member and said actuating member,
 said linking means being mounted in said handle portion to produce movement of said actuating member through said aperture to move said movable element and operate said motor control mechanism in response to the movement of said trigger member towards said handle portion.

10. A motion picture camera for use with a hand-held camera support and operating accessory,
 said accessory having a handle portion formed to be held in one hand by the operator of the camera,
 an actuating element in said handle portion,
 and a trigger member having a portion extending outside of said handle portion,
 said motion picture camera including a case,
 a lens system supported on said case,
 means to position photographic film behind said lens system,
 a camera drive motor mounted within said case for advancing said photographic film past said lens system in a picture taking operation,
 motor control means mounted within said case and connected to control the operation of said drive motor,
 first actuating means mounted on said case and having a portion extending outwardly from said case for manual manipulation by the operator of said camera,
 means coupling said first actuating means to said motor control means so that manual manipulation of said first actuating means by the operator of said camera will actuate said motor control means to operate said drive motor,
 an aperture in the bottom surface of said camera case,
 second actuating means mounted within said camera case including a movable element mounted behind said aperture,
 means coupling said movable element to said motor control means so that movement of said movable element will actuate said motor control means to operate said drive motor,
 light baffle means in said camera case for preventing external light entering said camera case through said aperture from impairing the quality of the photographic film in said camera case,
 and accessory attachment means at the bottom of said camera case to secure said support and operating accessory in manually releasable engagement with the bottom surface of said camera case, and said actuating element aligned with said aperture.

11. In combination, a motion picture camera having a case,
 a lens system supported on said case,
 means to position photographic film behind said lens system,
 a camera drive motor mounted within said case for advancing said photographic film past lens system in a picture taking operation,
 motor control means mounted within said case and connected to control the operation of said drive motor,
 first actuating means mounted on said case and having a portion extending outwardly from said case for manual manipulation by the operator of said camera,
 means coupling said first actuating means to said motor control means so that movement of said first actuating means by the operator of said camera will actuate said motor control means to operate said drive motor,
 and second actuating means mounted within said camera case and connected to said motor control means including a movable element mounted adjacent the bottom of said camera case;
 and a camera support and operating accessory having a handle portion formed to be held in one hand by the operator of the camera, a surface adapted to mate with a surface portion at the bottom of said camera case adjacent said movable element, manually releasable fastening means at the top of said handle member for releasably securing said matable surface of said handle member in mating relation with said surface portion of said camera case, an actuating member in said handle member mounted for movement through a portion of said matable surface, said actuating member being aligned with said movable element when said matable surface of said handle member is secured in mating relation with said surface portion of said camera case, a trigger member having a portion extending outside of said handle member, linking means coupling said trigger member and said actuating member, said linking means being mounted in said handle member to produce movement of said actuating member through the plane of said matable surface to move said movable element and operate said motor control mechanism in response to the movement of said trigger member towards said handle member, and resilient means cooperating with said actuating member to bias said actuating member in a direction inwardly of said handle member.

12. In combination, a motion picture camera having a case, a lens system supported on said case, means to position photographic film behind said lens system, a camera drive motor mounted within said case for advancing said photographic film past said lens system in a picture taking operation, motor control means mounted within said case and connected to control the operation of said drive motor, first actuating means mounted on said case including a rotatable control knob outside of said case for manual manipulation by the operator of said camera, a first mechanical linkage coupling said control knob to said motor control means so that rotation of said control knob by the operator of said camera will actuate said motor control means to operate said drive motor for advancing film past said lens system in a picture taking operation, an aperture in the bottom surface of said camera case, second actuating means mounted within said camera case including a reciprocable element mounted behind said aperture, a second mechanical linkage coupling said reciprocable element to said motor control means so that movement of said reciprocable element will actuate said motor control means to operate said drive motor, light baffle means in said camera case for preventing external light entering said camera case through said aperture from impairing the quality of the photographic film in said camera case, and accessory attachment means at the bottom of said camera case;

and a camera support and operating accessory comprising a handle portion formed to be held in one hand by the operator of the camera, said handle portion having a top surface adapted to be disposed immediately adjacent the bottom surface of said camera case, manually releasable fastening means at the top of said handle portion adapted to cooperate with said accessory attachment means for releasably securing the top surface of said handle portion immediately adjacent said bottom surface of said camera case, an actuating member mounted in said handle portion adjacent said handle portion top surface, said actuating member being aligned with said aperture when said handle portion is secured to said camera case, a trigger member having a portion extending outside of said handle portion, and linking means coupling said trigger member and said actuating member, said linking means being mounted in said handle portion to produce movement of said actuating member through said aperture into contact with said reciprocable element to operate said motor control mechanism in response to the movement of said trigger member towards said handle portion.

13. In combination, a motion picture camera having a case, a lens system supported on said case, means to position photographic film behind said lens system, a camera drive motor mounted within said case for advancing said photographic film past said lens system in a picture taking operation, motor control means mounted within said case and connected to control the operation of said drive motor, first actuating means mounted on said case and having a portion extending outwardly from said case for manual manipulation by the operator of said camera, means coupling said first actuating means to said motor control means so that manual manipulation of said first actuating means by the operator of said camera will actuate said motor control means to operate said drive motor, an aperture in the bottom surface of said camera case, second actuating means mounted within said camera case including a movable element mounted behind said aperture, means coupling said movable element to said motor control means so that movement of said movable element will actuate said motor control means to operate said drive motor, light baffle means in said camera case for preventing external light entering said camera case through said aperture from impairing the quality of the photographic film in said camera case, and accessory attachment means at the bottom of said camera case;

and a camera support and operating accessory comprising a handle portion formed to be held in one hand by the operator of the camera, said handle portion having a surface adapted to mate with a surface portion at the bottom of said camera case, an actuating rod in said handle portion mounted for movement in a direction perpendicular to and through the plane of said matable surface, manually releasable fastening means at the top of said handle portion adapted to cooperate with said accessory attachment means for releasably securing said matable surface of said handle portion in mating engagement with said surface portion of said camera case with said actuating rod in alignment with said aperture for movement therethrough when said handle portion is secured to said camera case, a trigger member having a portion extending outside of said handle portion, linking means coupling said trigger member and said actuating rod, said linking means being mounted in said handle portion to produce movement of said actuating rod through the plane of said matable surface and said aperture into contact with said movable element when said accessory is secured to said camera case to operate said motor control mechanism in response to the movement of said trigger member towards said handle portion, and resilient means cooperating with said actuating rod to bias said actuating rod in a direction inwardly of said handle portion.

14. In combination, a motion picture camera having a case, a lens system supported on said case, means to position photographic film behind said lens system, a camera drive motor mounted within said case for advancing said photographic film past said lens system in a picture taking operation, motor control means mounted within said case and connected to control the operation of said drive motor, first actuating means mounted on said case including a rotatable control knob outside of said case for manual manipulation by the operator of said camera, a first mechanical linkage coupling said control knob to said motor control means so that rotation of said control knob by the operator of said camera will actuate said motor control means to operate said drive motor for advancing film past said lens system in a picture taking operation, an aperture in the bottom surface of said camera case, second actuating means mounted within said camera case including a reciprocable element mounted behind said aperture, a second mechanical linkage coupling said reciprocable element to said motor control means so that movement of said reciprocable element will actuate said motor control means to operate said drive motor, light baffle means in said camera case for preventing external light entering said camera case through said aperture from impairing the quality of the photographic film in said camera case, and accessory attachment means at the bottom of said camera case;

and a camera support and operating accessory comprising a handle portion formed to be held in one hand by the operator of the camera, said handle portion having a surface adapted to mate with a surface portion at the bottom of said camera case, an actuating rod in said handle portion mounted for movement in a direction perpendicular to and through the plane of said matable surface, manually releasable fastening means at the top of said handle portion adapted to cooperate with said accessory attachment means for releasably securing said matable surface of said handle portion in mating engagement with said surface portion of said camera case with said actuating rod in alignment with said aperture for movement therethrough when said handle portion is secured to said camera case, a trigger member having a portion extending outside of said handle portion, linking means coupling said trigger member and said actuating rod, said linking means being mounted in said handle portion to produce movement of said actuating rod through the plane of said matable surface and said aperture into contact with said reciprocable element when said accessory is secured to said camera case to operate said motor control mechanism in response to the movement of said trigger member towards said handle portion, and resilient means cooperating with said actuating rod to bias said actuating rod in a direction inwardly of said handle portion.

15. A motion picture camera for use with a hand-held camera support and operating accessory, said accessory having a handle portion formed to be held in one hand by the operator of the camera, an actuating element in said handle portion, and a trigger member having a portion extending outside of said handle portion, said motion picture camera including a case, a lens system supported on said case, means to position photographic film behind said lens system, a camera drive motor mounted within said case for advancing said photographic film past said lens system in a picture taking operation, motor control means mounted within said case and connected to control the operation of said drive motor, first actuating means mounted on said case including a rotatable control knob outside of said case for manual manipulation by the operator of said camera, a first mechanical linkage coupling said control knob to said motor control means so that rotation of said control knob by the operator of said camera will actuate said motor control means to operate said drive motor for advancing film past said lens system in a picture taking operation, an aperture in the bottom surface of said camera case, second actuating means mounted within said camera case including a reciprocable element mounted behind said aperture, a second mechanical linkage coupling said reciprocable element to said motor control means so that movement of said reciprocable element will actuate said motor control means to operate said drive motor, light baffle means in said camera case for preventing external light entering said camera case through said aperture from impairing the quality of the photographic film in said camera case, and accessory attachment means at the bottom of said camera case to secure said support and operating accessory in manually releasable engagement with the bottom surface of said camera case, and said actuating element aligned with said aperture.

16. A motion picture camera for use with a hand-held camera support and operating accessory, said accessory having a handle portion formed to be held in one hand by the operator of the camera, an actuating etement in said handle portion.

and a trigger member having a portion extending outside of said handle portion, said motion picture camera including a case, a lens system supported on said case, means to position photographic film behind said lens system, a camera drive motor mounted within said case for advancing said photographic film past said lens system in a picture taking operation, motor control means mounted within said case and connected to control the operation of said drive motor, first actuating means mounted on said case including a rotatable control knob portion extending outwardly from said case for manual manipulation by the operator of said camera, means coupling said first actuating means to said motor control means so that manual manipulation of said first actuating means by the operator of said camera will actuate said motor control means to operate said drive motor, an aperture in the bottom surface of said camera case, second actuating means mounted within said camera case including a movable light baffle element mounted behind said aperture for preventing external light entering said camera case through said aperture from impairing the quality of the photographic film in said camera case, means coupling said movable element to said motor control means so that movement of said movable element will actuate said motor control means to operate said drive motor, and accessory attachment means at the bottom of said camera case to secure said support and operating accessory in manually releasable engagement with the bottom surface of said camera case, and said actuating element aligned with said aperture.

References Cited in the file of this patent

UNITED STATES PATENTS

| | | |
|---|---|---|
| 2,426,947 | Potts | Sept. 2, 1947 |
| 2,793,573 | Cuchet | May 28, 1957 |
| 2,928,315 | Broido | Mar. 15, 1960 |